United States Patent
Hao et al.

(10) Patent No.: US 8,228,946 B2
(45) Date of Patent: Jul. 24, 2012

(54) METHOD FOR FAIL-SAFE COMMUNICATION

(75) Inventors: Lijing Hao, Shanghai (CN); Mirko Ermini, San Giovanni Valdarno (IT)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/511,144

(22) Filed: Jul. 29, 2009

(65) Prior Publication Data

US 2011/0026411 A1   Feb. 3, 2011

(51) Int. Cl.
*H04J 3/22* (2006.01)
(52) U.S. Cl. .......................... 370/469; 370/445
(58) Field of Classification Search .................. 370/445, 370/469, 338, 400; 713/300; 710/104; 709/228; 375/219
See application file for complete search history.

(56) References Cited

U.S. PATENT DOCUMENTS

| | | | |
|---|---|---|---|
| 4,498,168 A | 2/1985 | Tseng | |
| 5,355,124 A * | 10/1994 | Kochem et al. | 398/59 |
| 5,598,149 A | 1/1997 | Schreiter et al. | |
| 5,727,157 A | 3/1998 | Orr et al. | |
| 5,805,801 A | 9/1998 | Holloway et al. | |
| 5,943,148 A | 8/1999 | Hamel et al. | |
| 6,061,603 A | 5/2000 | Papadopoulos et al. | |
| 6,069,897 A | 5/2000 | Perlman et al. | |
| 6,085,241 A | 7/2000 | Otis | |
| 6,109,568 A | 8/2000 | Gilbert et al. | |
| 6,253,345 B1 | 6/2001 | Agazzi et al. | |
| 6,327,511 B1 | 12/2001 | Naismith et al. | |
| 6,389,030 B1 | 5/2002 | Coden | |
| 6,397,114 B1 | 5/2002 | Eryurek et al. | |
| 6,560,290 B2 | 5/2003 | Ahn et al. | |
| 6,650,622 B1 | 11/2003 | Austerman, III et al. | |
| 6,671,583 B2 | 12/2003 | Varone et al. | |
| 6,675,070 B2 | 1/2004 | Lapham | |
| 6,680,922 B1 | 1/2004 | Jorgensen | |
| 6,691,165 B1 | 2/2004 | Bruck et al. | |
| 6,704,296 B1 | 3/2004 | Crayford et al. | |
| 6,711,698 B1 | 3/2004 | Marbach et al. | |
| 6,715,100 B1 | 3/2004 | Hwang | |
| 6,721,916 B2 | 4/2004 | Agazzi et al. | |
| 6,751,213 B1 | 6/2004 | Sun et al. | |
| 6,763,282 B2 | 7/2004 | Glenn et al. | |

(Continued)

FOREIGN PATENT DOCUMENTS

WO   0030293 A2   5/2000

(Continued)

OTHER PUBLICATIONS

PCT/US2010/043296, International Search Report and Written Opinion, Dec. 10, 2010.

(Continued)

*Primary Examiner* — Chandrahas Patel
(74) *Attorney, Agent, or Firm* — GE Global Patent Operation; John A. Kramer (57) ABSTRACT

A communication network is described. The network includes communication media and a plurality of network nodes coupled by the communication media. Each of the plurality of network nodes includes a first communication channel and a second communication channel. The first communication channel includes a first physical layer transceiver (PHY device) and the second communication channel includes a second PHY device. The plurality of network nodes are coupled in a dual ring-type topology.

1 Claim, 5 Drawing Sheets

U.S. PATENT DOCUMENTS

| | | |
|---|---|---|
| 6,772,036 B2 | 8/2004 | Eryurek et al. |
| 6,788,980 B1 | 9/2004 | Johnson |
| 6,801,949 B1 | 10/2004 | Bruck et al. |
| 6,802,737 B2 | 10/2004 | Bergner et al. |
| 6,851,610 B2 | 2/2005 | Knowles et al. |
| 6,853,316 B2 | 2/2005 | Payson et al. |
| 6,853,867 B1 | 2/2005 | Klindt et al. |
| 6,859,755 B2 | 2/2005 | Eryurek et al. |
| 6,864,812 B1 | 3/2005 | Lutkemeyer |
| 6,879,878 B2 | 4/2005 | Glenn et al. |
| 6,889,095 B1 | 5/2005 | Eidson et al. |
| 6,915,431 B1 | 7/2005 | Vasudevan et al. |
| 6,928,050 B2 | 8/2005 | Lynch et al. |
| 6,933,745 B2 | 8/2005 | Magal et al. |
| 6,952,727 B1 | 10/2005 | Lindner et al. |
| 6,968,905 B2 | 11/2005 | Adnan et al. |
| 6,975,637 B1 | 12/2005 | Lenell |
| 6,985,750 B1 | 1/2006 | Vicknair et al. |
| 7,028,204 B2 | 4/2006 | Jammes et al. |
| 7,035,898 B1 | 4/2006 | Baker |
| 7,043,393 B2 | 5/2006 | Fuller, III et al. |
| 7,069,111 B2 | 6/2006 | Glenn et al. |
| 7,081,827 B2 | 7/2006 | Addy |
| 7,085,497 B2 | 8/2006 | Tiemann et al. |
| 7,085,610 B2 | 8/2006 | Eryurek et al. |
| 7,095,348 B1 | 8/2006 | Sutardja et al. |
| 7,103,456 B2 | 9/2006 | Bloch et al. |
| 7,113,121 B1 | 9/2006 | Sutardja et al. |
| 7,123,991 B2 | 10/2006 | Graf et al. |
| 7,127,328 B2 | 10/2006 | Ransom |
| 7,146,408 B1 | 12/2006 | Crater et al. |
| 7,162,510 B2 | 1/2007 | Jammes |
| 7,165,005 B2 | 1/2007 | Steger et al. |
| 7,185,045 B2 | 2/2007 | Ellis et al. |
| 7,188,003 B2 | 3/2007 | Ransom et al. |
| 7,194,003 B2 | 3/2007 | Danner et al. |
| 7,212,492 B1 | 5/2007 | Au et al. |
| 7,769,046 B1 * | 8/2010 | Crocker .................. 370/474 |
| 7,836,223 B2 * | 11/2010 | Butcher .................... 710/31 |

FOREIGN PATENT DOCUMENTS

WO 2006108881 A1 10/2006

OTHER PUBLICATIONS

PCT/US2010/043296, Written Opinion, Dec. 10, 2010.

* cited by examiner

METHOD FOR FAIL-SAFE COMMUNICATION

BACKGROUND OF THE INVENTION

The field of the disclosure relates generally to communication networks and more specifically to fail-safe Ethernet communication networks.

High-speed communication channels are often designed as or considered to be non-vital parts of a vital system due to the level of difficulty that must be overcome to make the communication channels fail-safe and highly available. Fail-safety and availability issues in high-speed communication systems have been addressed. For example, an Attached Resource Computer NETwork (ARCnet) and a Token Ring network allow all nodes to have equal access to a network. Equal access to the network provides a predictable maximum transmission time dependent on the size of the data being transmitted. However, such technologies are typically proprietary. This limited the standardization and acceptance of these technologies, and therefore, the availability of supporting hardware/software. This limited the standardization and acceptance of supporting hardware/software in the market, which in turn hindered the application and growth of these technologies.

In contrast, Ethernet is an open network and has been standardized by the IEEE and the ISO. Various types of Ethernet hardware (e.g., PHY, MAC, switch, etc.), physical media, software, and protocols are consistently being developed by different vendors. Ethernet even adopted some features of competing technologies, for example, the star topology of ARCnet. The speed of matured Ethernet products was also quickly increasing, almost exponentially, from ten megabit per second (10 Mbps), to one hundred Mbps, and to as high as one gigabit per second (1 Gbps) and ten Gbps. Ethernet is not only widely accepted, but it also has survived the rapid changes of communication networking markets over time.

It would be advantageous to interface a high-speed communication network, such as Ethernet, with a fail-safe system, while maintaining a high level of safety and availability. The safety of a system can be measured against criteria such as the Security Integrity Levels (SIL) defined by the European Committee for Electrotechnical Standardization (CENELEC). Additionally, use of a standardized solution, such as Ethernet hardware/software, facilitates using economical hardware and software, which are readily available from the market.

BRIEF DESCRIPTION OF THE INVENTION

In one aspect, a communication network is provided. The network includes communication media and a plurality of network nodes coupled by the communication media. Each of the plurality of network nodes includes a first communication channel and a second communication channel. The first communication channel includes a first physical layer transceiver (PHY device) and the second communication channel includes a second PHY device. The plurality of network nodes are coupled in a dual ring-type topology, meaning that each of the plurality of network nodes is coupled to exactly two other nodes, and two pathways are provided between each of the plurality of network nodes.

In another aspect, an Ethernet hub is provided. The Ethernet hub includes a channel selection multiplexer, a plurality of Ethernet controllers coupled to the channel selection multiplexer, and a plurality of physical layer transceivers (PHY devices) coupled to the channel selection multiplexer. The plurality of PHY devices each comprises a transceiver that includes a transceiver input and a transceiver output.

In yet another aspect, a method for operating a communication system is provided. The communication system includes a plurality of network nodes. The method includes coupling the plurality of network nodes together using a dual-redundant Ethernet ring topology. The dual-redundant Ethernet ring topology includes at least a first communication channel and a second communication channel. The method also includes performing multiple-levels of loop-back testing including performing at least one of a protocol level loop-back test, a Media Access Controller (MAC) level loop-back test, a physical layer (PHY) level loop-back test, and/or an external loop-back test.

DETAILED DESCRIPTION OF THE INVENTION

Various embodiments described herein include a fail-safe communication system and, more particularly, a fail-safe Ethernet network system for use in railway communications. Technical effects of the various embodiments described herein include improving communication speed while providing fail-safe communication to a vital system.

Typically, fail-safe communication systems utilize serial communications which have limited transmission speed, for example, up to several hundred kilobit per second (Kbps). High-speed networks have been included within fail-safe communication systems but are often designed or considered as non-vital parts of a vital system due to the difficulty of making a high-speed network fail-safe. As used herein, a system that is fail-safe enters or remains in a safe state in the event of a failure. The European Committee for Electrotechnical Standardization (CENELEC) publishes standards that define the specification and demonstration of railway application safety. The methods and systems described herein facilitate operation of a high-speed communication network in such a way that the communication subsystem or the communication function of the system, in at least some embodiments, meets the requirements of Safety Integrity Level 4 (SIL4), while using off-the-shelf standard technology and cost effective supporting hardware/software. Safety Integrity Levels are defined by CENELEC to group methods, tools, and techniques which, when used effectively, are considered to provide an appropriate level of confidence in the realization of a system to a stated integrity level. For example, SIL4 requires a tolerable hazard rate (THR) between $10^{-9}$ and $10^{-8}$ per hour and per function.

In order for high-speed communication technology to be implemented in a safety-critical system, the methods and systems described herein address issues in the interface of high-speed communication channels to a fail-safe system, to be a part of that fail-safe system and enable the whole system, in at least some embodiments, to meet or exceed SIL4 criteria, and to address the improvement of reliability and availability of fail-safe network components.

Figure 1:
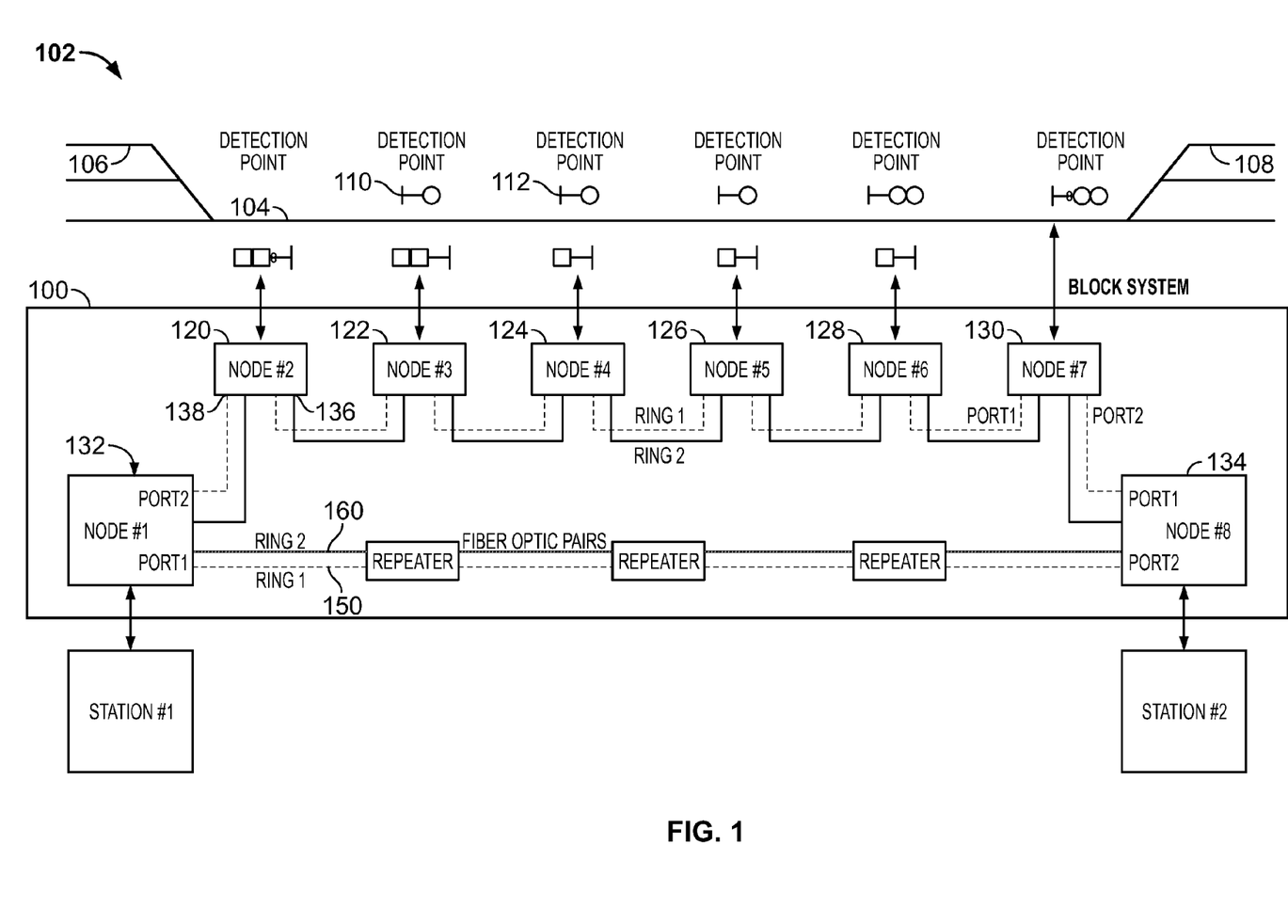
FIG. 1 is a block diagram of an exemplary embodiment of a high-speed fail-safe communication network.

FIG. 1 is a block diagram of an exemplary embodiment of a high-speed communication network 100. In the exemplary embodiment, communication network 100 is a component within an axle counter system 102. Axle counter system 102 is coupled to a railway track 104 that connects a first station 106 to a second station 108. Axle counter system 102 counts a number of railway car axles (not shown in FIG. 1) that pass a detection point, for example, detection points 110 and 112. Although communication network 100 is described as a component within axle counter system 102, communication network 100 may be used in any other system where high-speed, fail-safe communication is desired.

In the exemplary embodiment, communication network 100 includes a dual ring-type architecture. In the exemplary embodiment, communication network 100 is an Ethernet network, however, communication network 100 is not limited to Ethernet technology. Ethernet is a standardized computer networking technology used in local area networks. The standards are published as IEEE 802.3. As described herein, a ring-type architecture, also referred to as a ring network or a ring network topology, provides a single continuous pathway for signals through each node since each node connects to exactly two other nodes. A dual ring-type architecture provides two pathways between each node while maintaining the connection of each node to exactly two other nodes. For example, communication network 100 includes a plurality of nodes 120, 122, 124, 126, 128, 130, 132, and 134.

In the exemplary embodiment, communication network 100 includes multiple nodes. For example, communication network 100 may include a first peripheral unit 120, a second peripheral unit 122, a third peripheral unit 124, a fourth peripheral unit 126, a fifth peripheral unit 128, a sixth peripheral unit 130, a first subsystem 132, and a second subsystem 134. In the exemplary embodiment, each peripheral unit 120, 122, 124, 126, 128, and 130 or subsystem 132 and 134 appears in network 100 as one unique node. In the exemplary embodiment, peripheral unit 122 receives a signal from detection point 110 and peripheral unit 124 receives a signal from detection point 112. The signals represent, for example, a number of axles and a time when each axle passes detection points 110 and 112. As described above, each of nodes 120, 122, 124, 126, 128, 130, 132, and 134 is connected to two other nodes. For example, first peripheral unit 120 is connected to first subsystem 132 and second peripheral unit 122. More specifically, first peripheral unit 120 is connected to first subsystem 132 and second peripheral unit 122 through a first pathway 150 (also referred to herein as a first ring 150) and a second pathway 160 (also referred to herein as a second ring 160). Nodes 120, 122, 124, 126, 128, 130, 132, and 134 may be connected to form first ring 150 and second ring 160 using, for example, twisted-pair cables, fiber optic cables, and/or any other suitable communication media that enable network 100 to function as described herein. Moreover, as used herein, communication media refers to one or more mechanisms for the propagation of signals between nodes, such as, but not limited to, wires/cables, fiber optics, and wireless transmitters/receivers.

Typically, nodes in an Ethernet communication network are connected in a star topology where multiple peripheral nodes are each coupled to a central switch or computer. The central switch or computer acts as a multiplexer or router to transmit messages from source nodes to destination nodes. However, simultaneous transmission of data packets through a star topology network may result in a collision of the data packets. A collision of data packets causes a delay in the transmission time of the packets which causes the transmission time to become indeterminable. In contrast to a star topology, by connecting Ethernet nodes in a ring topology (i.e., one node's inputs (Rx) connect to upstream neighbor's outputs and the node's outputs (Tx) connect to downstream neighbor's inputs) all connections in the network are dual-ended. A dual-ended connection may also be referred to herein as a point-to-point connection. The collision of data packets is avoided through use of point-to-point connections.

When a node, for example first peripheral unit 120, is idle (i.e., has no data to send), node 120 listens to data packets received at a first port 136 and sends the received data packets directly to a second port 138 to be output to neighboring node 132. A period of time when node 120 is listening to the input data is referred to herein as a repeater mode or a safe mode, and the node in the repeater mode is referred to herein as a repeater node. When node 120 sends a data packet, node 120 is referred to herein as a source node, and is referred to herein as being in a transmitter mode. When node 120 is a source node, neighbor node 132 receives the data packet and transparently sends it to the next neighbor node 134. The data packet will be propagated to all other nodes 122, 124, 126, 128, and 130 of network 100, one node after another, and finally return to node 120, which initiated the data packet (i.e., the source node). In the exemplary embodiment, once the data packet is received back by source node 120, the data packet is no longer transmitted to any other network nodes in order to avoid loops. In other words, the ring is broken at the source node in order to avoid loops. At all times, there is only one source node on network 100. Only the source node can transmit new data packets (i.e., the transmitter mode), while all other nodes listen for data packets (i.e., the repeater mode).

Figure 2:
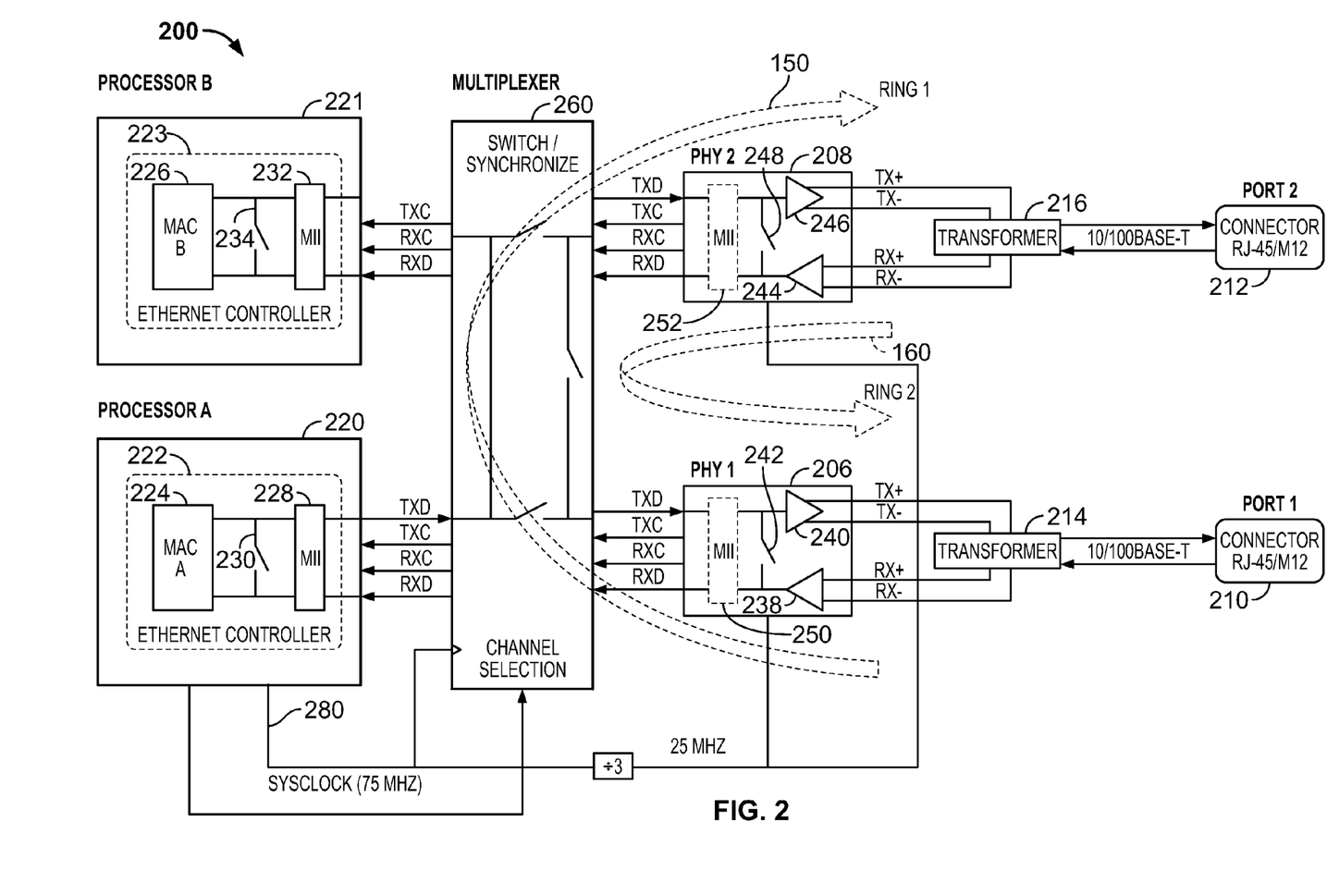
FIG. 2 is a block diagram of an exemplary embodiment of a dual-port hub that may be included within a network node of the high-speed communication network shown in FIG. 1.
Figure 3:
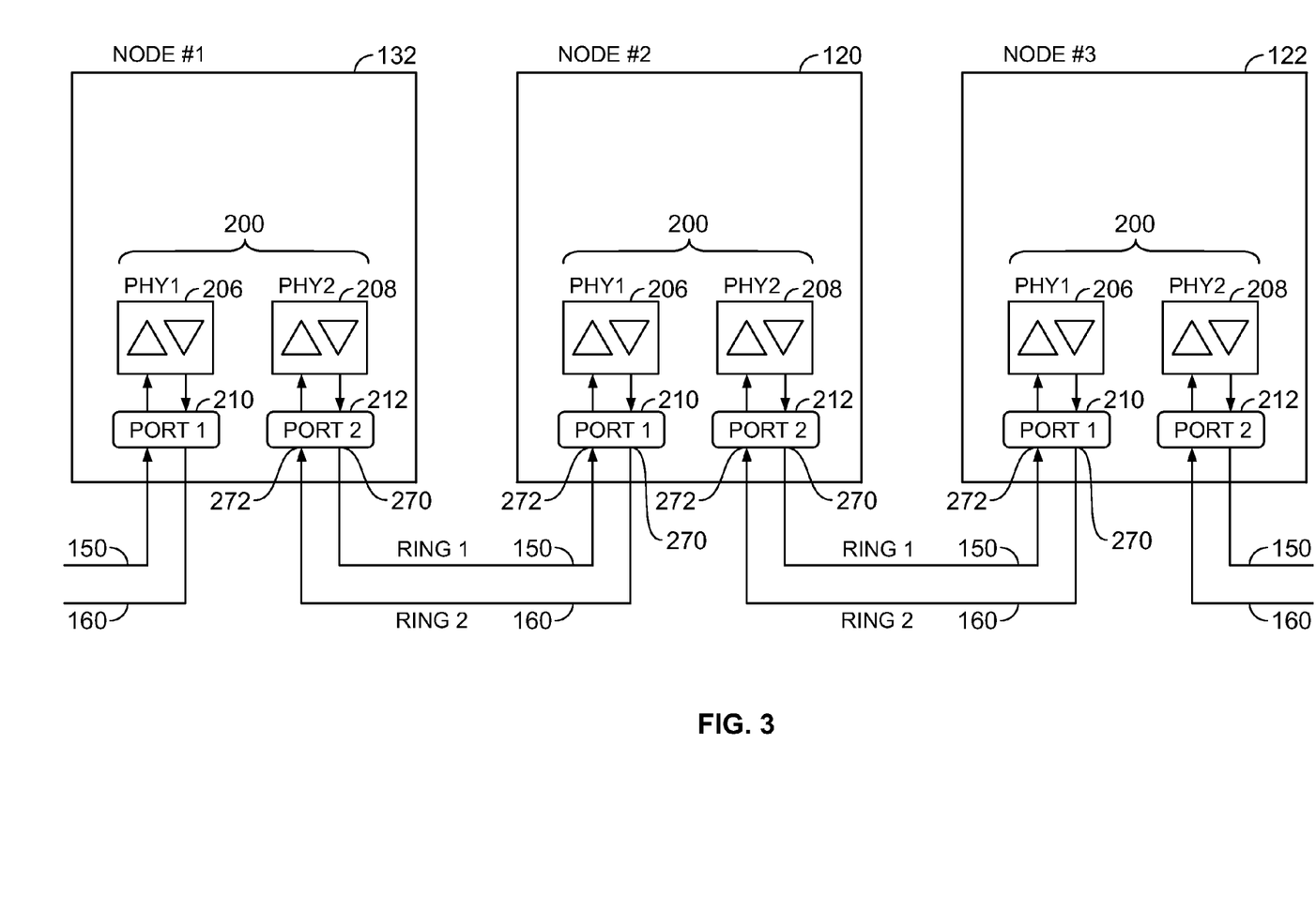
FIG. 3 is a block diagram of a portion of the network shown in FIG. 1.

FIG. 2 is a block diagram of an exemplary embodiment of a dual-port hub 200. FIG. 3 is a block diagram of a portion of network 100 (shown in FIG. 1). In the exemplary embodiment, at least one dual-port hub 200 is included within each node 120, 122, 124, 126, 128, 130, 132, and 134 (shown in FIG. 1). First pathway 150 and second pathway 160 connect nodes 120, 122, 124, 126, 128, 130, 132, and 134 in a dual-redundant ring-type architecture. In the exemplary embodiment, dual-port hub 200 includes two independent physical layer transceivers 206 and 208 coupled to two connector ports 210 and 212, respectively. Physical layer transceivers 206 and 208 are also referred to herein as PHY devices 206 and 208. In the exemplary embodiment, connector ports 210 and 212 are RJ-45 type ports, which may require a transformer, for example, transformers 214 and 216, to couple a data packet to a typical twisted-pair cable. Connector ports 210 and 212 may also include a ST bayonet-style connector, a MIL connector, or a SC plug-style for use with fiber optic cables, in which case, a pair of fiber optic transceivers may be required in place of transformers 214 and 216. Additionally, any suitable type of port or connector may also be used that allows dual-port hub 200 to function as described herein. In at least some embodiments, PHY device 206 and connector port 210 include a first media, for example, copper, and PHY device 208 and connector port 212 include a second media, for example, fiber optic cable. The use of different media provides additional redundancy and further mitigates certain common-mode failure modes. For example, a copper cable may be susceptible to electromagnetic interference while fiber optic cable may be vulnerable in high temperature environments. Use of different media may facilitate avoiding a loss of communication in the event of a single failure mode.

In the exemplary embodiment, dual-port hub 200 also includes a first processor 220 and a second processor 221. The term processor, as used herein, refers to central processing units, microprocessors, microcontrollers, reduced instruction set circuits (RISC), application specific integrated circuits (ASIC), programmable logic circuits (e.g., Field Programmable Gate Arrays or Complex Programmable Logic Devices), and any other circuit or processor capable of executing the functions described herein. In the exemplary embodiment, processors 220 and 221 include circuits, or have peripheral circuits, that function as Ethernet controllers and may be referred to herein as Ethernet controllers 222 and 223. Ethernet controllers 222 and 223 include media access controllers (MACs) 224 and 226, respectively. In the exemplary embodiment, Ethernet controller 222 also includes a media independent interface (MII) 228 and MAC loop-back hardware, for example switch 230. Similarly, Ethernet controller 223 includes a MII 232 and a MAC loop-back switch 234. In the exemplary embodiment, Ethernet controllers 222 and 223 are coupled to a channel selection multiplexer 260 via MIIs 228 and 232.

In the exemplary embodiment, PHY device 206 includes a receiver 238, a transmitter 240, and PHY loop-back hardware, for example, switch 242. Similarly, PHY device 208 includes a receiver 244, a transmitter 246, and a PHY loop-back switch 248. In the exemplary embodiment, PHY device 206 also includes a media independent interface (MII) 250 and PHY device 208 includes a MII 252. In the exemplary embodiment, PHY devices 206 and 208 are coupled to multiplexer 260 via MIIs 250 and 252. MAC loop-back switches 230 and 234 and PHY loop-back switches 242 and 248 are examples of loop-back test hardware that may be included within dual-port hub 200.

Referring now to FIG. 3, in the exemplary embodiment, nodes 120, 122, and 132 (also shown in FIG. 1) each include dual-port hub 200 (also shown in FIG. 2). In the exemplary embodiment, connector port 210 of node 120 is coupled to connector port 212 of node 132 via first pathway 150 and second pathway 160. In the exemplary embodiment, connector port 212 of node 120 is coupled to connector port 210 of node 122 via first pathway 150 and second pathway 160 to form the dual ring-type topology described above. For example, connector port 210 of node 120 includes a transmitter (TXR) port 270 and a receiver (RXR) port 272 that couple to the RXR port 272 and the TXR port 270, respectively, of connector port 212 of node 132. Furthermore, connector port 212 of node 120 also includes TXR port 270 and RXR port 272 which couple to RXR port 272 and TXR port 270, respectively, of connector port 210 of node 122.

Referring to FIGS. 2 and 3, in the exemplary embodiment, each of nodes 120, 122, and 132 may operate in either a transmitter mode or a repeater mode. When a node is operating in a transmitter mode, the node is referred to herein as a source node. The source node transmits a data packet that may include a destination address of a desired destination node for the data packet. When operating as a source node, processor 220 of dual-port hub 200 of the node sends data packets to at least one of pathway 150 and pathway 160, via transmitter 240 of PHY device 206 and/or via transmitter 246 of PHY device 208. When a node is operating in a repeater mode, MIIs 250 and 252 of PHY devices 206 and 208 are connected together by multiplexer 260. For example, receiver 238 of PHY device 206 may be coupled to transmitter 246 of PHY device 208. The coupling of receiver 238 and transmitter 246 enables the transparent pass-through of external data packets on pathway 150 (e.g., a repeater on the network). Similarly, the coupling of receiver 244 of PHY device 208 and transmitter 240 of PHY device 206 enables the transparent pass-through of external data packets on pathway 160. Accordingly, data packets sent from other nodes can be physically propagated to all nodes within network 100 on both pathway 150 and pathway 160 without the assistance of software.

In the exemplary embodiment, the transmitter mode facilitates preventing transmission of a data packet more than one time around network 100. For example, due to the presence of a source node, data packets will not be looped forever on network 100. Transmission of the data packet ends once the data packet being propagated by the repeater nodes is received back by the source node. The source node may include software to compare the data received back with the original data being sent out to enable the detection of a network failure. In an event of a network failure, the source node may choose to retransmit the same data through the same channel or to transmit the data through the other channel in the dual ring pathway. In an exemplary embodiment, in order to repeat data packets received on both of pathways 150 and 160, receiver 238 is coupled to transmitter 246 and receiver 244 is coupled to transmitter 240 when a node is operating in a repeater mode. If a data packet sent on pathway 150 is corrupted, an identical data packet may be sent on pathway 160 to avoid interruption of the communication. Selection of pathway 150 and/or pathway 160 may be controlled via hardware, for example, using multiplexer 260, in real-time. Application software may force the selection of a data packet from only one of pathways 150 and 160 to facilitate the detection of a pathway failure. Application software may also facilitate automatic switching between pathways 150 and 160 according to a health status of pathways 150 and 160.

While in the repeater mode, the node, for example, node 120, listens to the data packets passing through node 120. In the exemplary embodiment, node 120 waits to receive a network token and/or waits for a predetermined time-slot to enter the transmitter mode. In the exemplary embodiment, the network token (e.g., a variable in the software) is passed from one node to another via pathway 150 and/or pathway 160 at a predefined maximum interval. The node that possesses the token will be granted permission to transmit data packets while all the other nodes within network 100 listen and repeat received data packets. By granting transmission permission to only one node at a time, transmission collision is avoided and all nodes will have a determinable time-slot to transmit data packets to network 100. A maximum delay for a node to send its data to a destination is hence fully determinable. In some alternative embodiments, a network clock synchronization technology is used to achieve a determinable data packet delay in network 100. The time clock of all nodes in network 100 can be synchronized to a single network time clock and each node may be assigned a different time-slot to transmit its node data. Therefore, at any given time, only a single node transmits data packets and all the other nodes listen and repeat the transmitted data packets. In some embodiments, a software algorithm is used to negotiate a larger time-slot for nodes that have more data packets, or larger data packets, to transmit.

In the exemplary embodiment, upon receipt of the network token, node 120 has the choice to transmit data to either a downstream node (i.e., node 132) or an upstream node (i.e., node 122). For example, node 120 breaks only one of the two redundant rings 150 and 160 and transmits one or more data packets onto network 100 by disconnecting the receiver output of one PHY MII, for example, receiver 238 of PHY device 206, from the transmitter input of the other PHY MII, for example, transmitter 246 of PHY device 208, and routing the data packet from Ethernet controller 222 to the disconnected transmitter input, in this example, transmitter 246 of PHY device 208. Receiver 244 of PHY device 208 remains coupled to transmitter 240 of PHY device 206. By maintaining pathway 160 in a closed state, fault-tolerance is provided, because a malfunctioning node (e.g., a node sending data packets without obeying time or token constraints) will not block both pathway 150 and pathway 160. The rest of network 100 is able to function properly using the pathway that is not affected. For example, if a node fails to transmit its data through one of pathways 150 and 160, it can retry through the other pathway. In an alternative embodiment, a source node transmits data through both of rings 150 and 160, consecutively or simultaneously. In the alternative embodiment, the destination node can receive two separate data packets from the two rings 150 and 160, and through an integrity check of the two received data packets, the destination node may determine the integrity of the received data and select to use only the correct data packet.

In the exemplary embodiment, MII interfaces 250 and 252 of the two redundant PHY devices 206 and 208 are connected to multiplexer 260 to realize above described functions, for example, connection of receiver 244 and transmitter 240, connection of receiver 238 and transmitter 246, and connection of MII 250 and 252 to Ethernet controllers 222 and 223. In the exemplary embodiment, multiplexer 260 may include proper time-out and detection logic to recognize a node fault. For example, if a node breaks pathways 150 and 160 for more than a predetermined length of time (e.g., exceeding the maximum allowed packet delay), multiplexer 260 may disconnect receivers 238 and 244 of PHY devices 206 and 208 from Ethernet controllers 222 and 223 and connect them to transmitters 240 and 246 of PHY devices 206 and 208 respectively to restore the node to repeater mode. Placing the node in repeater mode places the node in a safe state during an unexpected error, which facilitates increasing a reliability, safety, and availability of network 100.

Figure 4:
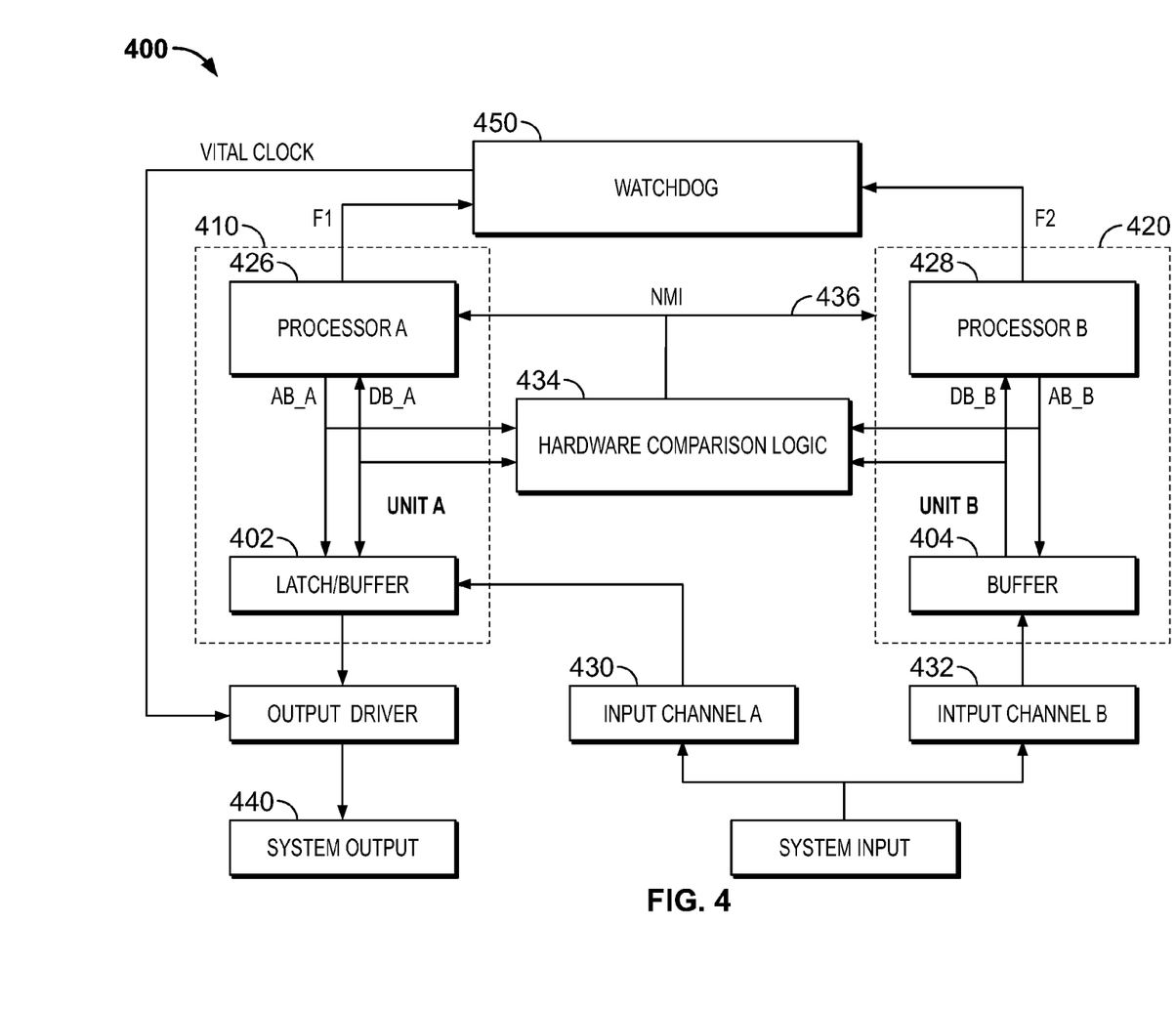
FIG. 4 is a block diagram of an exemplary embodiment of a fail-safe system architecture for use in at least one network node of the high-speed communication network shown in FIG. 1.

FIG. 4 is a block diagram of an exemplary embodiment of a two-out-of-two fail-safe architecture 400 for use in network 100 (shown in FIG. 1). In the exemplary embodiment, fail-safe architecture 400 facilitates the creating, synchronization, and processing of an MII data stream. Typically, a composite fail-safe system consists of two or more identical units that execute the same function synchronously. Hardware and/or software are configured for fault detection and recovery. In the exemplary embodiment, in order for a communication channel to be a vital component within a system, the data stream is synchronized to the system operation of each node included within the communication channel.

In the exemplary embodiment, synchronization enables each identical unit within a composite fail-safe system to receive an identical data stream at substantially the same time. Accordingly, all units are able to process the data received synchronously and to compare the data received with the data received by other units in real-time to facilitate preventing unsafe operation due to a failure of a single unit.

In the example of a two-out-of-two vital system, where PHY device 206 and PHY device 208 (shown in FIG. 2) operate synchronously, a clock is derived from a single system clock 280 (shown in FIG. 2) used by both PHY devices 206 and 208. PHY transmitter 246 is synchronized to this clock so that it will generate outbound bit streams synchronously. PHY receiver 244 is synchronized to the input bit stream from which its receiver clock is recovered. At least one buffer, for example buffers 402 and 404, in a memory register a portion of the data stream. An MII receiver clock (ERxCLK) sequence is regenerated from the system clock 280, the nibble data stream is registered and then shifted-out at RxCLK to recreate a new, system clock synchronized nibble data/status stream which is sent to MAC 224 and MAC 226. By synchronizing the data stream sent to MAC 224 and 226, MAC 224 and 226 will receive data synchronously and in turn generate receiver interrupts at substantially the same time. The Ethernet interface of architecture 400 facilitates maintaining the vital two-out-of-two system fail-safe structure and achieving a high safety integrity level.

As described above, typically, a composite fail-safe system includes two or more identical units that have sufficient isolation between each other to avoid an occurrence of a common-mode failure. Each of the identical units receives external inputs through its own input channel and processes the input independently. The behaviors, such as read, write, input, output, status, and internal control, of these identical units are compared against each other by either hardware or software. If a discrepancy is found between these units, the system will either enter and remain in a protective state during which all outputs are placed in a pre-determined safe state, or the system arbitration logic/algorithm will determine which unit(s) to trust and negate the others. In an exemplary embodiment, as shown in FIG. 4, fail-safe architecture 400 includes two substantially identical units, for example, unit 410 and unit 420. Units 410 and 420 operate synchronously. In the exemplary embodiment, unit 410 includes input buffer 402 and a processor 426. Unit 420 includes an input buffer 404 a processor 428. Processors 426 and 428 may perform the functions described above with respect to processors 220 and 221 (shown in FIG. 2).

In the exemplary embodiment, unit 410 receives inputs via an input channel 430 and unit 420 receives inputs via an input channel 432. When receiving Ethernet inputs, input channels 430 and 432 may be included within multiplexer device 260 (shown in FIG. 2). More specifically, multiplexer device 260 may generate two synchronous and identical input data streams from a single system input stream, received by PHY device 206 or 208, and may supply them separately to unit 410 and unit 420, to enable independent processing of the data. A hardware comparison logic 434 compares the inputs, outputs, and status of units 410 and 420, and, upon the detection of any difference between units 410 and 420, generates a Non-maskable Interrupt (NMI) 436 to force both unit 410 and unit 420 into a safe state (e.g., de-energize the outputs and put the network node in repeater mode).

In the exemplary embodiment, arbitration between units 410 and 420 may be simplified by selecting either the output of unit 410 or the output of unit 420. In the exemplary embodiment, only unit 410 is driving a system output 440, however, since the outputs of both unit 410 and unit 420 are already being compared and agreed upon, either one of the two units 410 and 420 can drive the output 440 of the whole system. For example, when the output of unit 410 does not agree with the output of unit 420, the output of both unit 410 and unit 420 will be put into safe state, therefore, it again makes no difference which of units 410 and 420 drives the system outputs 440. Additionally, in the exemplary embodiment, fail-safe architecture 400 includes a monitoring logic, also referred to herein as a "watchdog logic" 450. Watchdog logic 450 is periodically triggered by a unique pattern generated by both unit 410 and unit 420. If either unit 410 or unit 420 fails to trigger watchdog logic 450 with a predetermined pattern, sequence, and/or the timing of the trigger does not meet a pre-determined requirement, watchdog logic 450 will place the system output 440 to the safe state regardless of the output of the unit it connects with. In the exemplary embodiment, devices implementing watchdog logic 450 and hardware comparison logic 434 are separate physical devices from units 410 and 420. Separating units 410 and 420 from watchdog logic 450 and hardware comparison logic 434 facilitates preventing a compromise of the safety of architecture 400 due to a failure of unit 410 and/or unit 420.

Figure 5:
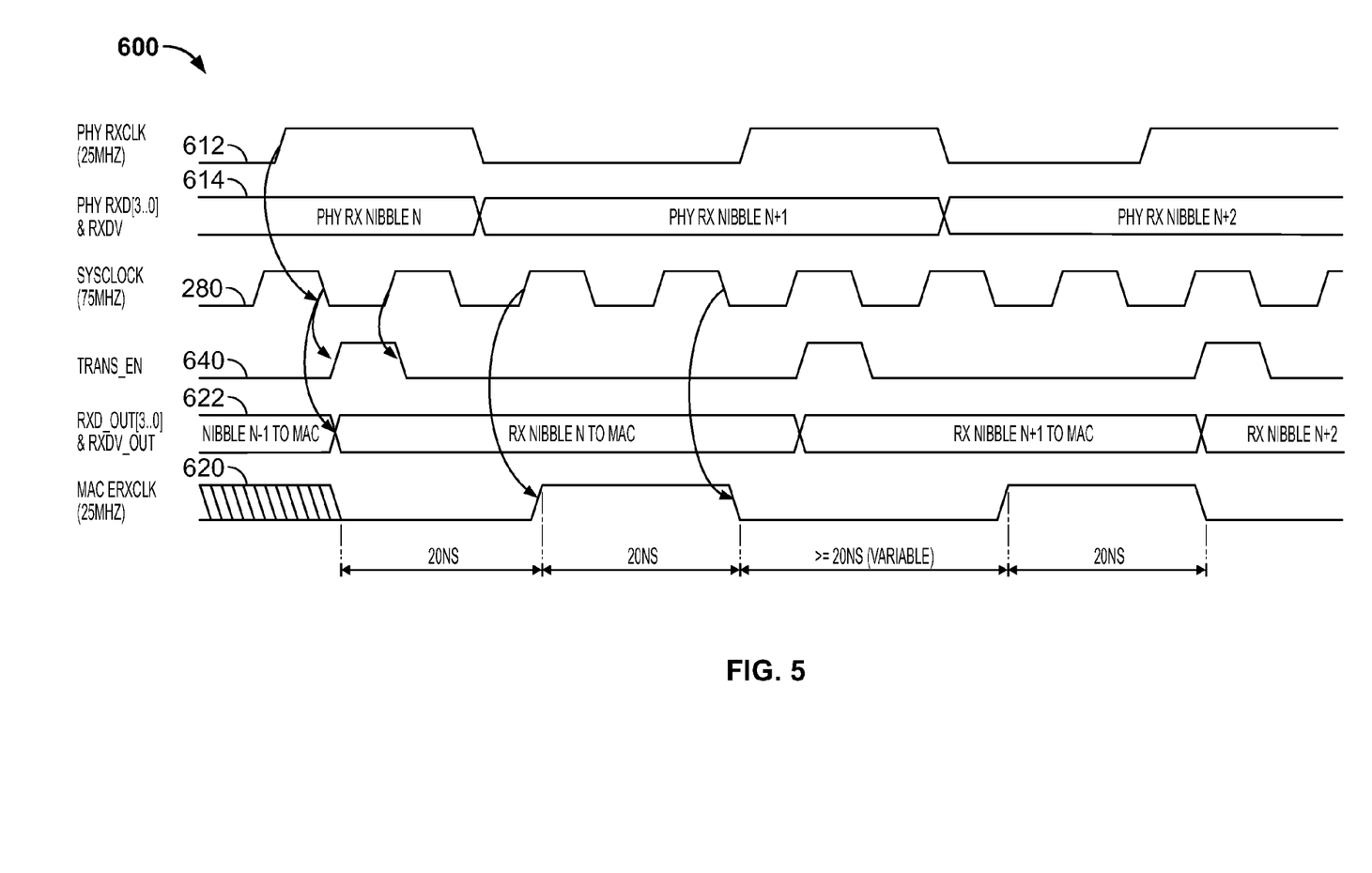
FIG. 5 is an exemplary timing diagram that illustrates the synchronization of nibble data streams from the PHY receiver outputs to the MAC inputs shown in FIG. 2.

FIG. 5 is an exemplary timing diagram 600 of signals flowing through multiplexer 260 (shown in FIG. 2). Timing diagram 600 illustrates the synchronization of the input data stream that enables fail-safe processors 426 and 428 (shown in FIG. 4) to receive Ethernet data inputs via two different channels, for example, input channels 430 and 432, synchronously. For example, a nibble data stream 614 from one of PHY device 206 and 208 is delayed to align with system clock 280 and hence create a synchronized nibble data/status stream (ERxCLK) 620 for each of the two identical processors 426 and 428 (shown in FIG. 4).

Exemplary timing diagram 600 includes the original data clock, RxCLK 612 recovered by a PHY receiver circuit, for example, receiver 238 shown in FIG. 2. As described above, RxCLK 612 is recreated from the incoming data stream whose timing may be affected by the distance between network nodes and by other network characteristics such as media type and transceiver performance. Therefore, RxCLK 612 is asynchronous to the system operation clock 280 (also shown in FIG. 2) of the local node. Similarly, PHY receiver data nibble (RxD[3..0]) and data valid signal (RxDV), referred to herein as Ethernet data/status 614, are asynchronous to system clock 280 as well. If the local processors, for example, processors 220 and 221 (shown in FIG. 2), which are working synchronously with system clock 280, read Ethernet data/status 614 directly, they may register the input data and status when theses signals are changing. To facilitate avoiding registering the input data and status when the input data and status are changing state, RxCLK 612 and data/status 614 are registered first and then regenerated as ERxCLK 620 and RxD_OUT[3..0] and RxDV_OUT 622 at the edge of system clock 280 with the assistance of a nibble recognition logic (Trans_EN) 640.

Furthermore, in the exemplary embodiment, to achieve a high SIL in an Ethernet connection, four different levels of loop-back tests may be used to periodically verify data stream integrity. Verifying data stream integrity facilitates providing reactive fail-safety, for example, as defined by CENELEC. An interval between executions of the loop-back tests may be determined by software to balance between network safety and data stream throughput. Accordingly, even when there is only a single physical media in the Ethernet network, the network can still maintain a high level of safety integrity. The loop-back tests and packet integrity check embedded in various communication layers/protocols facilitate consistent detection and avoidance of network failures.

In the exemplary embodiment, a first loop-back test is a protocol level loop-back test. The protocol level loop-back test is embodied in software run by, for example, processors 220 and 221 (shown in FIG. 2). By sending test data packets to a specific internal loop-back address, data packets are effectively tunneled directly to a receiver packet buffer at a transport layer, rather than going to a lower layer such as the MAC or the physical layer. The protocol level loop-back test is accomplished at a software level. Hardware does not see any data traffic due to the protocol level loop-back test. The protocol level loop-back test may be used as the first step of any connectivity test to verify basic functionality of a protocol stack and an application interface. The protocol level loop-back test does not interrupt the normal operation of a running application. By running in the background, the protocol level loop-back test is transparent to an end user.

In the exemplary embodiment, a second loop-back test is an Ethernet controller loop-back test, also referred to herein as a MAC loop-back test. The Ethernet controller, for example, Ethernet controller 222 (shown in FIG. 2), is configured so that outgoing packets from MAC 224 are routed to MAC 224 inputs via loop-back switch 230 instead of being sent to a PHY device, for example, PHY device 206. Utilizing the MAC loop-back test, full functionality of software and most features of the MAC hardware are verified. In the exemplary embodiment, the MAC loop-back test interrupts the receiving of any incoming packets as well as the output of any outgoing packets. During the MAC loop-back test, PHY devices 206 and 208 will not receive any output packets from Ethernet controller 222 as the output packets are directed to MAC inputs internally. Accordingly, in the exemplary embodiment, the MAC loop-back test is performed when communication is not active (e.g. no input and output packets for a specific time-out period). In some embodiments, the MAC loop-back test may be enabled and disabled by a bit flag in a MAC control register.

In the exemplary embodiment, a third loop-back test is a PHY level loop-back test. Similar to the MAC loop-back test, in the exemplary embodiment, PHY devices connect transceiver inputs and outputs together internally to perform the PHY level loop-back test, for example, using switches 242 and 248 (shown in FIG. 2). During the PHY level loop-back test, test packets are not sent to a transformer (in case of copper media) or a fiber optic transceiver module (in the case of fiber media). PHY level loop-back tests are often performed when communication is not active, because in the PHY level loop-back test mode PHY devices may lose any incoming packets from the input ports. In some embodiments, the PHY level loop-back test mode may be enabled and disabled by a bit flag in the PHY control register.

In the exemplary embodiment, a fourth loop-back test is an external loop-back test. The external loop-back test may include application level functions at both ends of the Ethernet connection (or at all nodes of a complex network). When a specific test packet is recognized by a node, application software will respond to the sender with either an identical packet or a transformed packet that in-turn can be recognized as a valid reply. The identical packet is also referred to as an "echo", and to return the "echo" to the source, a destination address in the header is modified to point to the source of the test packet. A transformed packet may be formed after performing specific calculations or after encryption/decryption of the input test packet. The transformed packet prevents interference, unintentional short circuit, and other failure modes from providing a valid "echo" to the source node of the test packet when an error is present in the network. In contrast, it is highly unlikely that interference, unintentional short circuit, or other failure modes might happen to form an intended transformed response packet which is different than the input test packet. In the exemplary embodiment, the external loop-back test does not affect the normal operation of network 100. Test packets are treated in the same way as non-test data packets. In the exemplary embodiment, any failure modes that can corrupt communication may invalidate the test data stream and hence be detected.

In addition to the methods and systems described above, a power-carrying cabling technology may be included within network 100 (shown in FIG. 1) to facilitate achieving high network availability in power failure situations. Power-carrying cabling technology enables the cables between network nodes to carry a small amount of power that can sustain the normal or minimum required functionality of the nodes. For example, network 100 may include Power-on-Ethernet technology, defined in IEEE 802.3af. In network 100, PHY devices 206 and 208 and multiplexer 260 of each node may be powered by the power carried over the Ethernet cable, independent from system power. In the event of a power failure in one or more of the nodes, at a minimum the PHY devices and the multiplexer(s) of the node(s) will continue to work in the repeater mode so that network 100 is not blocked. When system power is present or restored, the nodes contribute power to the nodes downstream and upstream via cables.

In the exemplary embodiment, a fail-safe communication network is described. The communication network may use matured and off-the-shelf technology such as Ethernet hardware, software, and specifications. The communication network includes a plurality of network nodes, wherein each of the plurality of network nodes includes at least two communication channels. The plurality of network nodes are coupled by a dual ring-type topology that connects the two communication channels. The communication network grants transmission permission to only one of the plurality of the network nodes by the passing of a single token within the network. The plurality of network nodes place themselves in repeater mode and listen to the network traffic when not possessing a transmission token. The plurality of network nodes transfer the token, which enables transmission of data from the node that possesses the token, from one node to another at a pre-determined interval or time-slot to guarantee that each of the plurality of network nodes has equal access to the network. Each of the plurality of network nodes may include multiple-levels of loop-back test hardware and software to provide reactive fail-safety. Each of the plurality of network nodes also may include multiplexer hardware to switch between the two channels. Each of the plurality of network nodes may also include software to detect the integrity of data received, to determine the health status of the plurality of channels, and to route output data to one of the correct-functioning communication channels. Each of the plurality of network nodes dynamically validates and selects data from any of the communication channels. Furthermore, each of the plurality of network nodes may include input synchronization logic to enable the synchronization of high-speed asynchronous data inputs to the system clock of the corresponding node, wherein the data inputs are processed independently by a composite fail-safe system. The communication network may include power-carrying cabling technology to enable the achievement of higher availability in the event of a power failure.

The methods and systems described herein address key technologies in a fail-safe Ethernet. As described herein, the methods and systems may include data stream synchronization technology that enables the connection of a physical layer transceiver (PHY) to a composite fail-safe system (e.g., a two-out-of-two vital system). The methods and systems may also include multiple-levels of loop-back testing to ensure the reactive fail-safety of the network link. The methods and systems may also include a ring network topology that facilitates reducing and/or eliminating data transmission collision in the network. The methods and systems may also include protocols that make the transmission delay deterministic and a dual-redundant Ethernet ring topology that realizes a high-availability fail-safe network. The methods and systems may also include comparison, arbitration, and watchdog technology that places the system into a safe state during an unexpected failure. The methods and systems may also include the application of power-carrying cabling technology to increase network availability and fail-safety during a power failure.

The methods and systems described herein may be used in the networking of fail-safe equipment such as equipment included in a vehicle control system and/or a railway signaling system. Typically, either a vital system was limited to individual stand-alone components, or the size, area, and speed of the vital network was limited, for example, to a few components connected via legacy serial ports. The methods and systems described herein enable wide-area, for example, from hundreds of meters to thousands of kilometers depending on the media type and the network equipment involved, a large quantity of nodes, and vital network communication at high-speed, for example 100 Mbps and higher.

The methods and systems described herein facilitate the enhancement of performance, safety, reliability, and availability of existing fail-safe systems. For example, by applying the methods and systems described herein, signaling systems may be able to operate in a larger area at higher speeds. Distributed equipment can effectively form a high-speed network to realize complex calculation, detection/protection, signaling, and/or control functions. A cost per unit of system/function may be lowered and/or a value to a system operator may be increased. The technology described herein may improve the safety of existing communication systems and may increase the availability (i.e., the up-time) of the system. Therefore, the customer may benefit from safer service and fewer interruptions of the service.

Described herein are exemplary methods and systems for network communication. More specifically, the methods and systems described herein enable fail-safe operation of a high-speed communication system, using off-the-shelf components. The hardware synchronous system described herein is simple, reliable, and adds minimal overhead to the network, which makes the network fast, low-cost, and expandable, while compositely and reactively fail-safe.

The methods and systems described herein facilitate efficient and economical operation of a fail-safe network. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a communication system, the communication system comprising a plurality of network nodes, the method comprising:

coupling the plurality of network nodes together using a dual-redundant Ethernet ring topology, wherein the dual-redundant Ethernet ring topology includes at least a first communication channel and a second communication channel;

performing multiple-levels of loop-back testing including performing at least one of a protocol level loop-back test, a Media Access Controller (MAC) level loop-back test, a physical layer (PHY) level loop-back test, and an external loop-back test, and determining an interval between execution of the loop-back tests that balances between network safety and data stream throughput; and transmitting a network data packet upon receipt of a network token by a receiving network node, wherein the network token places the receiving network node in a transmitter mode.

* * * * *